US009528535B2

(12) United States Patent
Massengill

(10) Patent No.: US 9,528,535 B2
(45) Date of Patent: Dec. 27, 2016

(54) MULTIFUNCTIONAL ADAPTOR

(71) Applicant: ILLINOIS TOOL WORKS INC., Glenview, IL (US)

(72) Inventor: Michael Massengill, Waren, MI (US)

(73) Assignee: Illinois Tool Works Inc., Glenview, IL (US)

(*) Notice: Subject to any disclaimer, the term of this patent is extended or adjusted under 35 U.S.C. 154(b) by 542 days.

(21) Appl. No.: 13/792,386

(22) Filed: Mar. 11, 2013

(65) Prior Publication Data
US 2014/0255087 A1 Sep. 11, 2014

(51) Int. Cl.
*F16B 1/00* (2006.01)
*B60R 16/02* (2006.01)
*H02G 3/32* (2006.01)

(52) U.S. Cl.
CPC ............. *F16B 1/00* (2013.01); *B60R 16/0222* (2013.01); *H02G 3/32* (2013.01); *Y10T 403/44* (2015.01)

(58) Field of Classification Search
CPC ........... B60R 16/0207; B60R 2011/005; B60R 2011/0052; B60R 2011/0059; B60R 2011/0063; B60R 2011/0066; B60R 2011/0071; Y10T 24/33; Y10T 24/3467; Y10T 24/44017; F16L 3/06; F16L 3/221; F16L 3/222
See application file for complete search history.

(56) References Cited

U.S. PATENT DOCUMENTS

| 3,552,696 | A  | * | 1/1971  | Orenick et al. | ............... 248/74.3 |
|-----------|----|---|---------|----------------|---------------------------|
| 4,708,306 | A  | * | 11/1987 | Mitomi         | ........................ 248/74.3 |
| 4,999,887 | A  |   | 3/1991  | Kraus          |                           |
| 5,002,243 | A  | * | 3/1991  | Kraus et al.   | ................. 248/68.1 |
| 5,966,781 | A  | * | 10/1999 | Geiger         | ..................... F16L 3/137 24/16 PB |
| 6,152,406 | A  | * | 11/2000 | Denndou        | ...................... 248/68.1 |
| 6,196,751 | B1 | * | 3/2001  | Khokhar        | ................... F16D 1/08 24/16 PB |
| 6,290,201 | B1 | * | 9/2001  | Kanie et al.   | .................. 248/636 |

(Continued)

FOREIGN PATENT DOCUMENTS

| EP | 1 744 087 | * | 1/2001 | ................ F16L 3/04 |
|----|-----------|---|--------|---------------------------|
| EP | 1 566 872 |   | 8/2005 |                           |
| WO | 97/31416  |   | 8/1997 |                           |

*Primary Examiner* — Michael P Ferguson
(74) *Attorney, Agent, or Firm* — Joseph M. Butscher; The Small Patent Law Group, LLC

(57) ABSTRACT

A multifunctional adaptor (10) for connecting at least one vehicle component to a vehicle support member (120) includes a body (30) having a base (50) and a shaft (70) that extends from the base (50). The base (50) terminates at a first axial end surface (52) and the shaft (70) terminates at a second axial end surface (80). A first passage (42) extends from the first axial end surface (52) towards the second axial end surface (80) for receiving a first fastener (100) to secure the adaptor (10) to the support member (120). A second passage (44) extends from the second axial end surface (80) towards the first axial end surface (52) for receiving a second fastener (104) to secure a first vehicle component to the adaptor. A third passage (90) extends transverse to the first passage (42) and the second passage (44) and entirely through the body (30) for receiving a third fastener (106) to secure a second component to the adaptor (10).

23 Claims, 4 Drawing Sheets

(56) References Cited

U.S. PATENT DOCUMENTS 6,533,226 B2 * 3/2003 Geiger .................... F16L 3/237
                                                    248/68.1
2002/0084388 A1    7/2002 Geiger
2011/0303799 A1* 12/2011 Blanchard et al. ............. 248/65

* cited by examiner

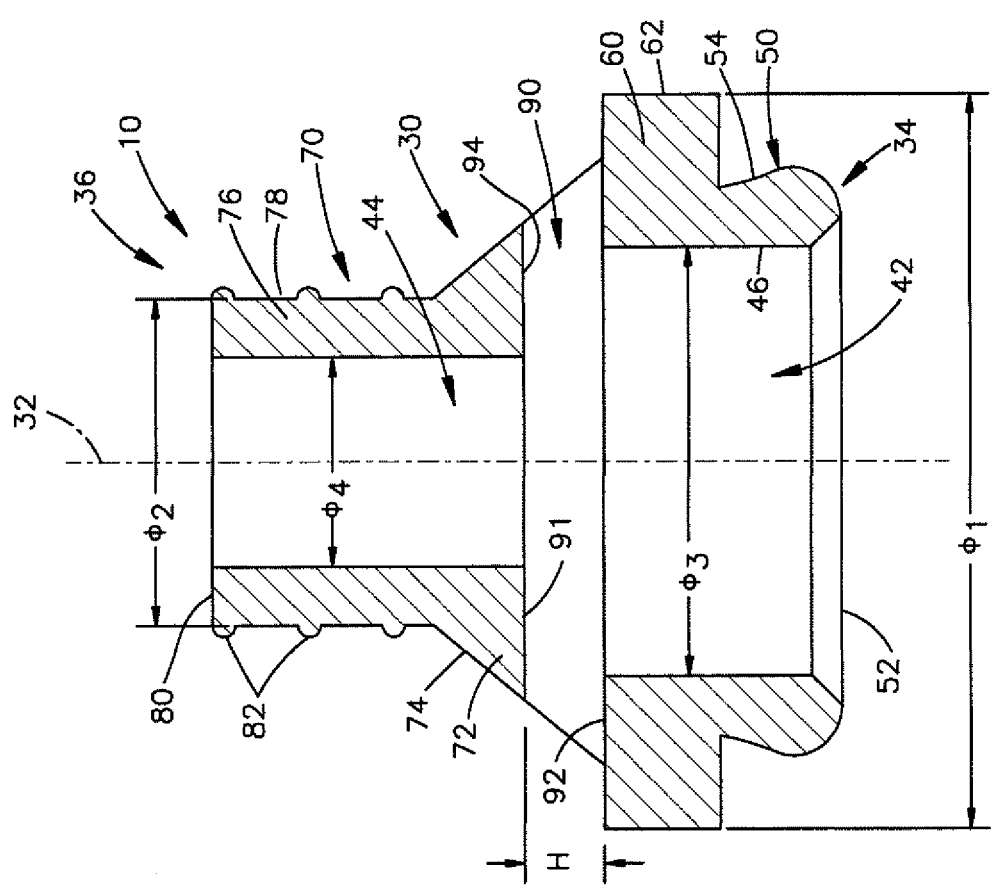
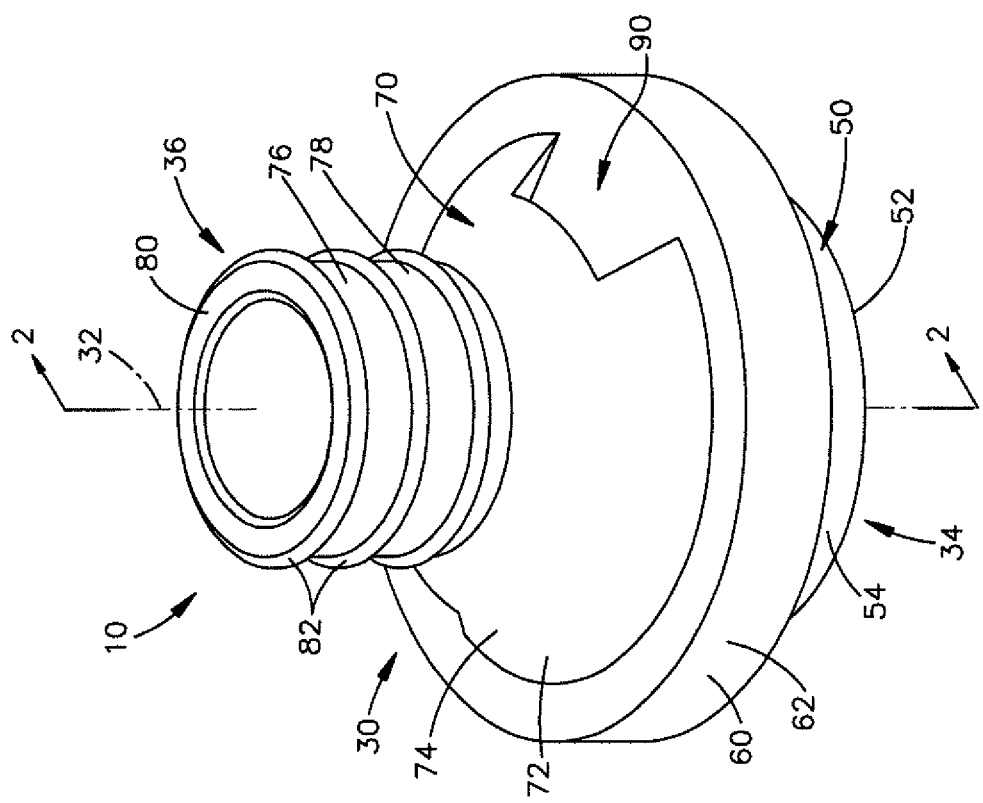

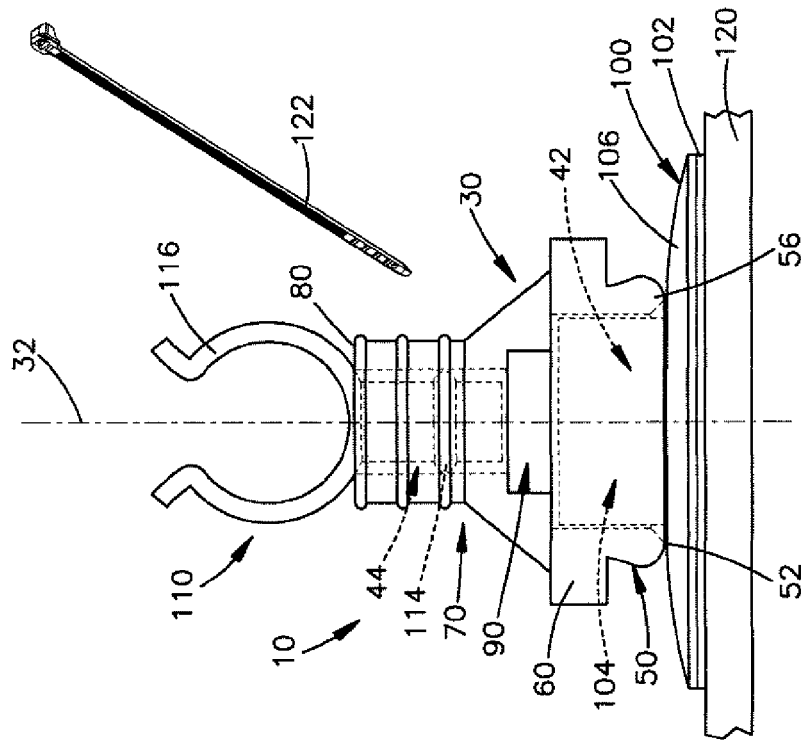
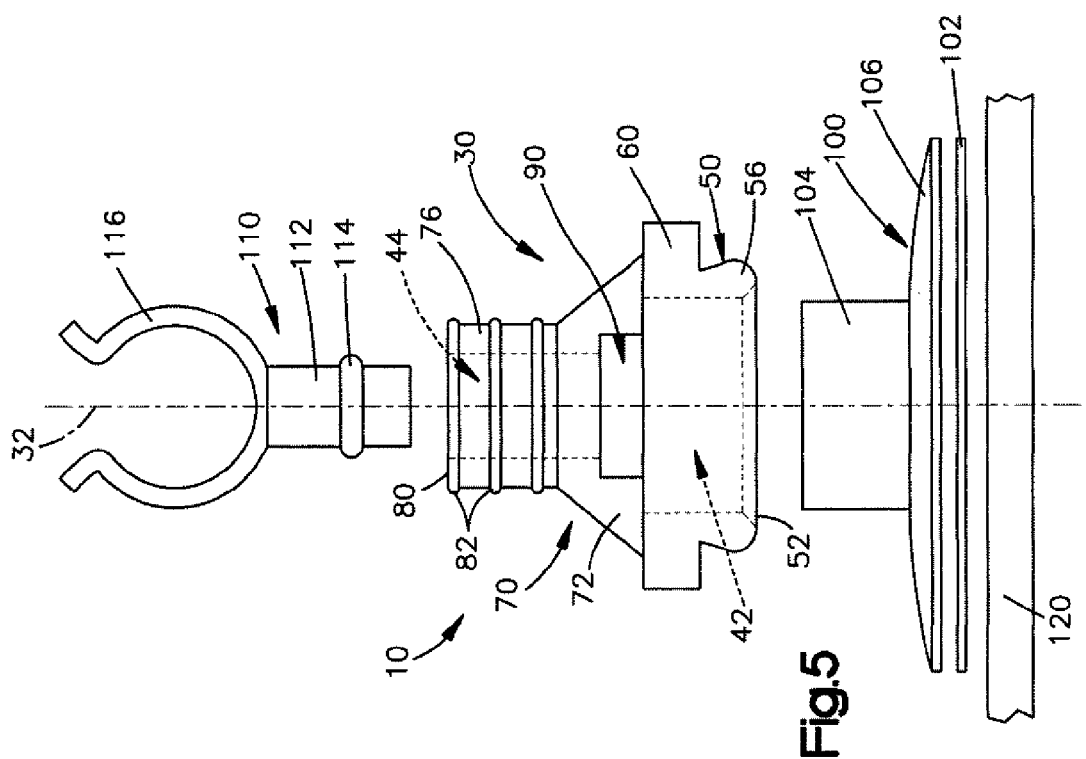

MULTIFUNCTIONAL ADAPTOR

TECHNICAL FIELD

The invention relates to an adaptor and, in particular, relates to a multifunctional adaptor capable of simultaneously receiving different fasteners to secure vehicle components together.

BACKGROUND

Adaptors are often used in the automotive industry, for example, for holding vehicle components including cable straps, decorative strips or other objects to be placed against the vehicle body or inside the vehicle. The components are held, in each case, through a fastening device associated with the adaptor. Depending on the configuration of the vehicle and the components, however, several different fastening devices may be required to secure all the desired components to the vehicle.

SUMMARY OF THE INVENTION

In accordance with the present invention, a multifunctional adaptor for connecting at least one vehicle component to a vehicle support member includes a body having a base and a shaft that extends from the base. The base terminates at a first axial end surface and the shaft terminates at a second axial end surface. A first passage extends from the first axial end surface towards the second axial end surface for receiving a first fastener to secure the adaptor to the support member. A second passage extends from the second axial end surface towards the first axial end surface for receiving a second fastener to secure a first vehicle component to the adaptor. A third passage extends transverse to the first passage and the second passage and entirely through the body for receiving a third fastener to secure a second component to the adaptor.

In accordance with another aspect of the invention, a multifunctional adaptor for connecting at least one vehicle component to a support member of a vehicle includes a body that extends along an axis from a first end to a second end. The body includes a base and a shaft that extends from the base. The base terminates at a first axial end surface at the first end of the body. The shaft terminates at a second axial end surface at the second end of the body. The shaft has a tapered portion that extends from the base. A cylindrical portion extends from the tapered portion. The cylindrical portion has a plurality of ribs that extend radially outward. A first passage having a first diameter extends along the axis from the first axial end surface towards the second axial end surface for receiving a first fastener to secure the adaptor to the support member. A second passage having a second, different diameter extends along the axis from the second axial end surface towards the first axial end surface for receiving a second fastener to secure a first vehicle component to the adaptor. A third passage extends perpendicular to the axis entirely through the tapered portion of the shaft for receiving a third fastener to secure a second vehicle component to the adaptor.

Other objects and advantages and a fuller understanding of the invention will be had from the following detailed description of the preferred embodiments and the accompanying drawings.

BRIEF DESCRIPTION OF THE DRAWINGS

FIG. 1 is a schematic view of a multifunctional adaptor in accordance with the present invention;

FIG. 2 is a section view of the adaptor of FIG. 1 taken along line 2-2;

FIG. 5 is a schematic view of the adaptor of FIG. 1 being secured to a vehicle support member and receiving a first fastener for a first vehicle component;

FIG. 6 is a schematic view of the adaptor of FIG. 5 receiving a second fastener for a second vehicle component;

DETAILED DESCRIPTION

Figure 4:
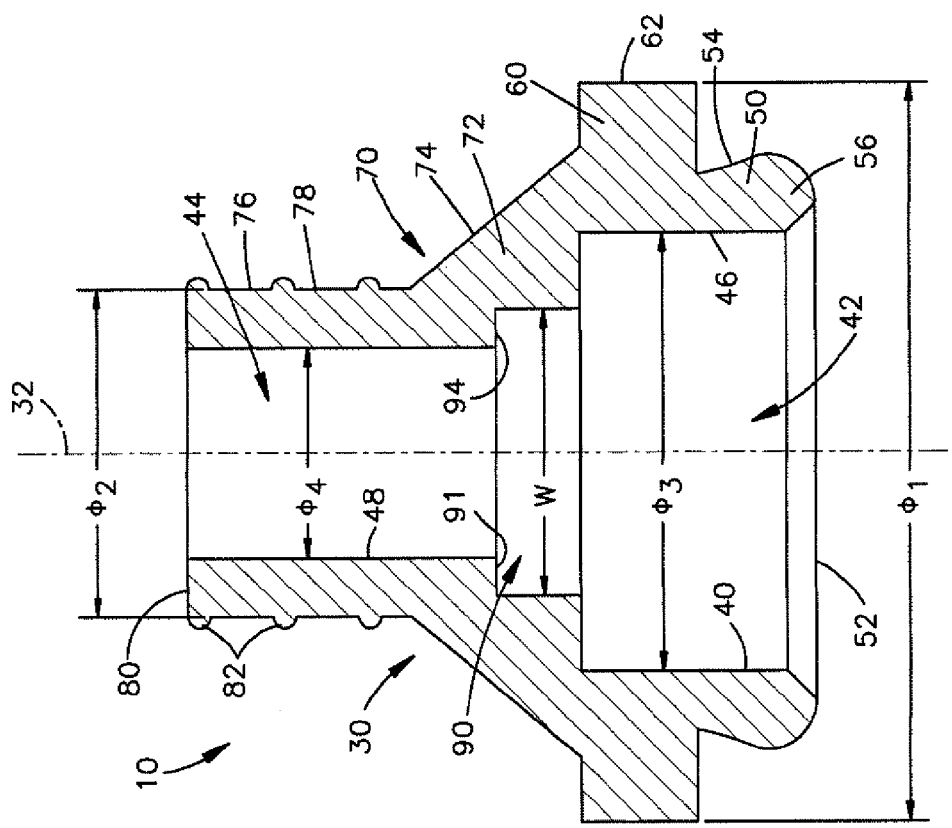
FIG. 4 is a section view of the adaptor of FIG. 1 taken along line 4-4.

The invention relates to an adaptor and, in particular, relates to a multifunctional adaptor capable of simultaneously receiving different fasteners to secure vehicle components together. FIGS. 1-5 illustrate a multifunctional adaptor 10 in accordance with the present invention. The adaptor 10 is formed as a unitary structure from a rigid or resilient material, e.g., a metal, polymer or plastic material.

Referring to FIGS. 1 and 2, the adaptor 10 includes a body 30. The body 30 extends along an axis 32 from a first end 34 to a second end 36. The first end 34 of the body 30 includes a base 50. The base 50 terminates at an axial end surface 52 of the body 30. The end surface 52 is substantially planar but may likewise be concave or convex (not shown). The base 50 has a generally circular shape but may alternatively have any polygonal shape, e.g., triangular or rectangular. The base 50 includes a generally frustoconical outer surface 54. The outer surface 54 may taper inwards or outwards relative to the axis 32 in a direction extending towards the end surface 52. As shown, the outer surface 54 tapers outward as the surface extends towards the end surface 52 and then inwards to connect to the end surface. Alternatively, the outer surface 54 may be cylindrical (not shown).

The base 50 further includes a radially extending flange 60 spaced from the end surface 52. The flange 60 has a circular shape but may alternatively have any polygonal shape. The outer surface 62 of the flange 60 extends parallel to the axis 32 but may alternatively taper relative to the axis. The outer surface 62 has a diameter $\Phi_1$.

A shaft 70 extends from the base 50 towards the second end 36 of the body 30. The shaft 70 may be integrally molded with the base 50 or may be a separate piece connected to the base (not shown). The shaft 70 includes a tapered portion 72 and a cylindrical portion 76. The tapered portion 72 extends from the flange 60. The tapered portion 72 tapers inward towards the axis 32 in a direction extending towards the second end 36 of the body 30. The tapered portion 72, therefore, includes an outer surface 74 having a frustoconical shape. The outer surface 74 may extend at any desired angle relative to the axis 32.

Figure 3:
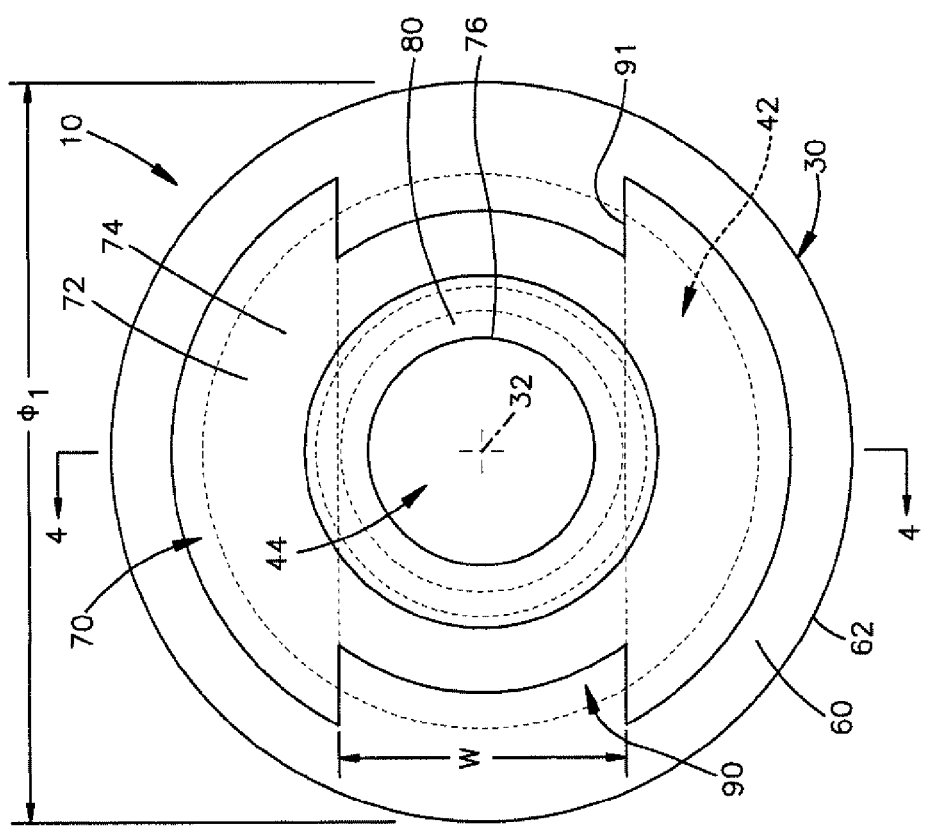
FIG. 3 is a top view of the adaptor of FIG. 1.

The cylindrical portion 76 extends from the tapered portion 72 towards the second end 36 of the body 30. The cylindrical portion 76 terminates at an axial end surface 80. The cylindrical portion 76 may be centered about the axis 32 or may extend at an angle (not shown) relative to the axis. The cylindrical portion 76 has an outer surface 78 having a diameter $\Phi_2$. As shown in FIG. 3, the diameter $\Phi_2$ is smaller than the diameter $\Phi_1$ of the flange 60.

One or more ribs 82 extend radially outward from the outer surface 78 of the cylindrical portion 76. Each rib 82 extends around the entire circumference of the cylindrical portion 76. Alternatively, each rib 82 may constitute a series of discrete segments that extend around a portion of or the entire circumference of the cylindrical portion 76. It is contemplated that the ribs 82 may be helical threads. In any case, the ribs 82 may extend radially outward the same distance from the axis 32 or may extend different distances from the axis. The ribs 82 may have any cross-sectional shape, such as frustoconical, cylindrical or toroidal.

A first inner wall 46 of the body 30 defines a first passage 42. The first passage 42 extends within the base 50 from the end surface 52 towards the second end 36 of the body 30. The first passage 42 has a generally circular cross-section and terminates within or adjacent to the flange 60. A portion of the first passage 42 adjacent the end surface 52 may have a frustoconical cross-section. The first passage 42 extends along the axis 32 but may alternatively extend parallel to the axis or extend at an angle relative to the axis (not shown). The first passage 42 has a diameter $\Phi_3$ that is larger than the outer diameter $\Phi_2$ of the cylindrical portion 76 of the shaft 70.

A second inner wall 48 of the body 30 defines a second passage 44. The second passage 44 extends within the shaft 70 from the end surface 80 towards the first end 34 of the body 30. The second passage 44 has a circular cross-section and terminates within the tapered portion 72 of the shaft 70. The second passage 44 extends along the axis 32 but may alternatively extend parallel to the axis or extend at an angle relative to the axis. The second passage 44 has a diameter $\Phi_4$ that is smaller than the diameter $\Phi_3$ of the first passage 42. It will be understood, however, that the first passage 42 may have a smaller diameter than the diameter of the second passage 44 or the first and second passages may have the same diameter.

A third inner wall 91 of the body 30 defines a third passage 90. The third passage 90 extends entirely through the shaft 70 transverse to the axis 32. The third passage 90 extends through the axis 32 but may likewise be spaced from the axis (not shown). In any case, the third passage 90 extends transverse to the first passage 42 and the second passage 44. The third passage 90 has a substantially rectangular or square cross-section and intersects the first passage 42 and/or the second passage 44. In other words, the third passage 90 may connect the first passage 42 to the second passage 44. The third passage 90 has a height H that extends along the axis 32 from a first surface 92 to a second surface 94. As shown in FIG. 2, the first surface 92 defines an axial end surface of the flange 60 of the base 50. The second surface 94 defines an interior surface of the tapered portion 72 of the shaft 50. It will be appreciated, however, that the surfaces 92, 94 of the third passage 90 may be located in any portion 72, 76 of the shaft 70 and/or any portion of the base 50 (not shown). Referring to FIGS. 3-4, the third passage 90 further has a width W that extends perpendicular to the axis 32. The width W and/or height H of the third passage 90 may be constant along the entire third passage or may be variable. Although a single third passage 90 is illustrated, it will be appreciated that more or fewer passages, including zero, extending transverse to the axis 32 may be provided in the body 30.

In operation, and referring to FIGS. 5-6, the adaptor 10 is secured to a support member 120 of a vehicle via the first passage 42. More specifically, the first passage 42 is configured to receive a first fastener 100, for example, the male snap fastener illustrated schematically in FIG. 5, for securing the adaptor 10 to the support member 120. As shown, the first fastener includes a base 106 and an adaptor receiving portion 104 extending therefrom. The portion 104 of the first fastener 100 is inserted into the first passage 42 such that the first fastener and adaptor 10 become non-rotatably fixed to one another via press-fit, mechanical fastening, adhesive or the like. In one example, the portion 104 is sized to be greater than the diameter $\Phi_3$ of the first passage 42. Consequently, the portion 104 frictionally engages the inner wall 46 of the first passage to form a secure connection therebetween, which inhibits removal of the adaptor 10 from the first fastener 100. An adhesive, such as double-sided tape 102, is used to securely fix the base 106 of the first fastener 100 to the support member 120. The adhesive 102 thereby securely fixes the adaptor 10 to the support member 120.

The second passage 44 is configured to receive a second fastener 110 illustrated schematically in FIGS. 5-6. The second fastener 110 may constitute a push pin or swivel clip fastener for securing a first vehicle component (not shown) to the adaptor 10. As shown, the second fastener 110 includes a shaft 112 and a component receiving portion 116 extending therefrom. A protrusion 114 extends radially outward from the shaft 112. The protrusion 114 may have a cross-section that is larger than the diameter $\Phi_4$ of the second passage 44. Consequently, inserting the shaft 112 of the second fastener 110 into the second passage 44 causes the protrusion 114 to frictionally engage the inner wall 48, which inhibits removal of the second fastener from the second passage. The connection between the second passage 44 and the second fastener 110 may, however, allow the second fastener and, thus, may allow the first component therein (not shown) to be rotated about the axis 32 relative to the adaptor 10 over 360°. Such a construction advantageously allows the second fastener 110 to rotate to any position relative to the adaptor 10 to accommodate a first component oriented in any number of different configurations relative to the adaptor and support member 120.

The third passage 90 is configured to receive a third fastener 122, such as a cable tie illustrated schematically in FIG. 6, for securing a second vehicle component (not shown) to the adaptor 10. The third fastener 122 extends through the entire third passage 90 and may help secure the second vehicle component to any portion of the adaptor 10. The height H and width W of the third passage 90 may provide flexibility to movement of the third fastener 122 within the third passage to accommodate various second vehicle components. The third passage 90 may also be configured to receive multiple third fasteners 122 in accordance with the present invention.

Figure 7:
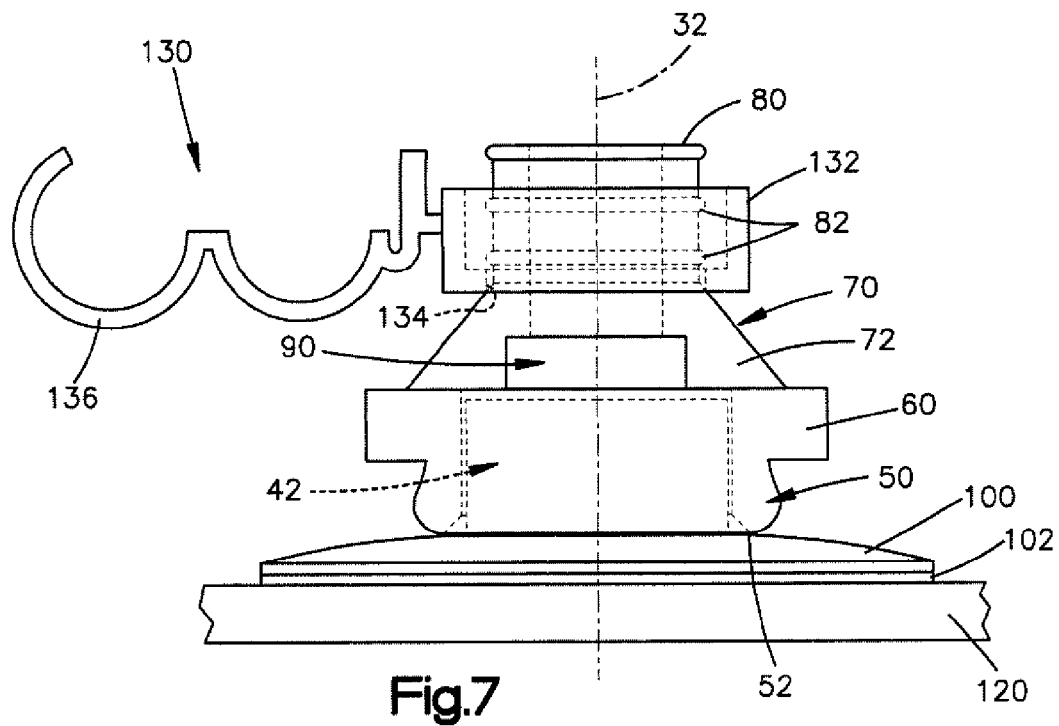
FIG. 7 is a schematic view of the adaptor of FIG. 1 receiving a second fastener for a second vehicle component.
Figure 8:
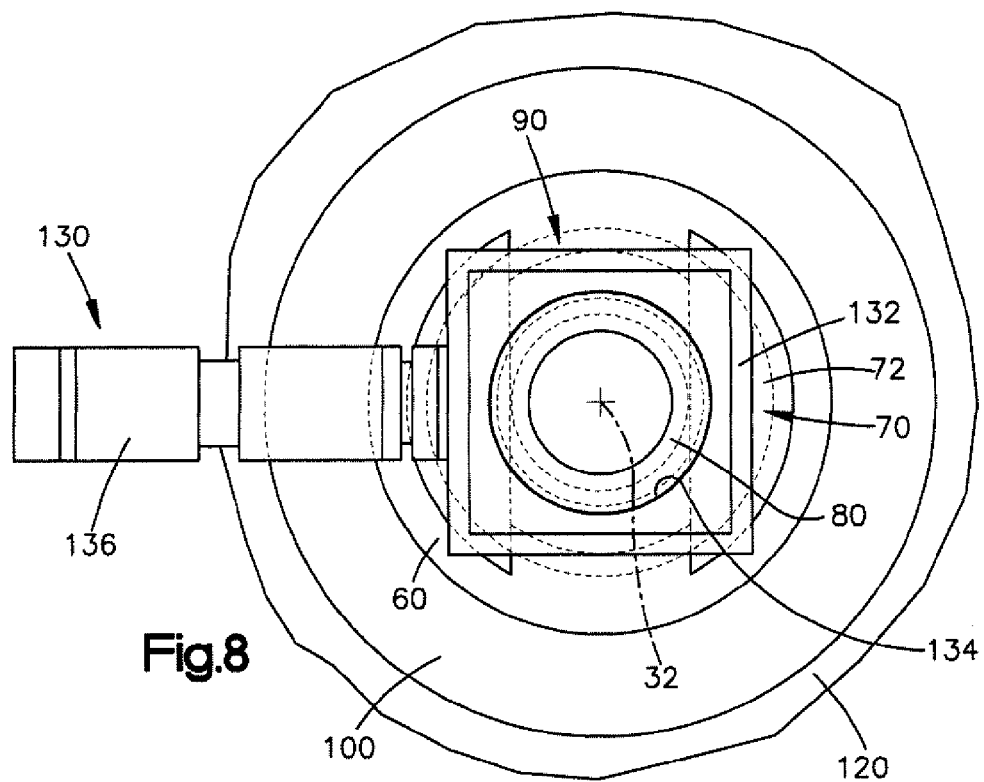
FIG. 8 is a top view of FIG. 7.

The ribs 82 of the shaft 70 are configured to receive a fourth fastener 130, for example, a fastener with a stud retainer illustrated schematically in FIGS. 7-8, for securing a third vehicle component (not shown) to the adaptor 10. As shown, the fourth fastener 130 includes a base 132 and a component receiving portion 136 extending therefrom. The base 132 may have a rectangular shape and include an opening 134 for receiving the cylindrical portion 76 of the shaft 70. The opening 134 may include threads (not shown) that mate with the ribs 82 on the shaft 70. Also, a series of resilient, flexible fingers (not shown) may extend radially into the opening 134 and be capable of moving relative to one another to accommodate the cylindrical portion 76 of the shaft 70.

The fourth fastener 130 is pushed or threaded onto the shaft 70 until the opening 134 in the base 132 passes over one or more of the ribs 82. The ribs 82 and base 132 cooperate to inhibit removal of the fourth fastener 130 from the shaft 70. Once the fourth fastener 130 is secured to the adaptor 10 the third vehicle component can be received by the portion 136 of the fourth fastener to secure the third vehicle component to the adaptor and the support member 120.

Although not shown, the fourth fastener 130 may cooperate with the third fastener 122 to secure additional vehicle components to the adaptor 10. For example, when the fourth fastener 130 is secured to the shaft 70 and the third fastener 122 extends through the third passage 90, the third and fourth fasteners are aligned generally along the axis 32 of the adaptor 10. Therefore, the third fastener 122 can help secure vehicle components that are placed atop the base 132 of the fourth fastener 130. Accordingly, the third fastener 122 can help secure multiple vehicle components to the fourth fastener 130 to thereby secure multiple vehicle components to the adaptor 10 and vehicle support member 122.

Due to the configuration of the adaptor 10 of the present invention, each passage 42, 44, 90 and the cylindrical portion 76 of the shaft 70 can advantageously accommodate any number of fasteners. Accordingly, each passage 42, 44, 90 and the cylindrical portion 76 are capable of securing multiple vehicle components having many different configurations to the adaptor 10 and support member 120.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. A multifunctional adaptor configured to connect at least one vehicle component to a support member of a vehicle comprising:
   a body extending along an axis from a first end to a second end, the body including a base and a shaft extending from the base, the base terminating at a first axial end surface and the shaft terminating at a second axial end surface;
   a first passage extending along a first portion of the axis from the first axial end surface towards the second axial end surface and configured to receive a first fastener from a first direction to secure the adaptor to the support member;
   a second passage extending along a second portion of the axis through the second axial end surface towards the first axial end surface and configured to receive a second fastener from a second direction opposite the first direction to secure a first vehicle component to the adaptor;
   a third passage extending transverse to and between the first passage and the second passage through the shaft and configured to receive a third fastener to secure a second vehicle component to the adaptor; and
   wherein the shaft includes at least one rib extending radially outward from the shaft for receiving a fourth fastener to secure a third vehicle component to the adaptor.

2. The multifunctional adaptor of claim 1, wherein the first passage and the second passage extend along an axis of the body.

3. The multifunctional adaptor of claim 1, wherein the shaft includes a tapered portion extending from the base and a cylindrical portion extending from the tapered portion and terminating at the second axial end surface.

4. The multifunctional adaptor of claim 3, wherein the third passage extends perpendicular to the first passage and the second passage and through the tapered portion of the shaft.

5. The multifunctional adaptor of claim 3, wherein a flange extends radially outward from the base, the third passage being defined between a surface of the flange and a surface of the tapered portion of the shaft.

6. The multifunctional adaptor of claim 1, wherein the first passage has a first diameter and the second passage has a second diameter different from the first diameter.

7. The multifunctional adaptor of claim 6, wherein the first diameter is larger than the second diameter.

8. The multifunctional adaptor of claim 1, wherein a flange extends radially outward from the base and the shaft extends from the flange.

9. The multifunctional adaptor of claim 1, wherein the third passage connects the first passage to the second passage.

10. The multifunctional adaptor of claim 1, wherein the base and the shaft are integrally molded with one another.

11. The multifunctional adaptor of claim 1, wherein the third passage has a width that is larger than the diameter of the second passage.

12. The multifunctional adaptor of claim 1, wherein the third passage constitutes the only opening between the first and second axial end surfaces that is transverse to the first and second passages.

13. The multifunctional adaptor of claim 1, wherein each of the at least one ribs is a single, continuous projection that completely encircles the second passage.

14. The multifunctional adaptor of claim 1, wherein the third passage extends entirely through the body in a direction that is perpendicular to at least one of the first passage and the second passage.

15. A multifunctional adaptor configured to connect at least one vehicle component to a support member of a vehicle comprising:
   a body extending along an axis from a first end to a second end, the body including a base and a shaft extending from the base, the base terminating at a first axial end surface at the first end of the body and the shaft terminating at a second axial end surface at the second end of the body, the shaft having a tapered portion extending from the base and a cylindrical portion extending from the tapered portion, the cylindrical portion having a plurality of axially spaced apart ribs extending radially outward;
   a first passage having a first diameter, the first passage extending along a first portion of the axis from the first axial end surface towards the second axial end surface and configured to receive a first fastener from a first direction to secure the adaptor to the support member;
   a second passage having a second, different diameter, the second passage extending along a second portion of the axis through the second axial end surface towards the first axial end surface and configured to receive a second fastener from a second direction opposite the first direction to secure a first vehicle component to the adaptor; and
   a third passage extending between the first passage and second passage perpendicular to the axis and through the tapered portion of the shaft and configured to receive a third fastener to secure a second vehicle component to the adaptor.

16. The multifunctional adaptor of claim 15, wherein a flange extends radially outward from the base, the third passage being defined between a surface of the flange and a surface of the tapered portion of the shaft.

17. The multifunctional adaptor of claim 15, wherein the first diameter is larger than the second diameter.

18. The multifunctional adaptor of claim 15, wherein a flange extends radially outward from the base and the tapered portion of the shaft extends from the flange.

19. The multifunctional adaptor of claim 15, wherein the third passage connects the first passage to the second passage.

20. The multifunctional adaptor of claim 15, wherein the base and the shaft are integrally molded with one another.

21. The multifunctional adaptor of claim 15, wherein the third passage extends entirely through the body in a direction that is perpendicular to at least one of the first passage and the second passage.

22. A multifunctional adaptor configured to connect at least one vehicle component to a support member of a vehicle comprising:
- a body extending along an axis from a first end to a second end, the body including a base and a shaft extending from the base, the base terminating at a first axial end surface and the shaft terminating at a second axial end surface, a plurality of axially spaced apart ribs extending radially outward from the shaft and configured to receive a first fastener to secure a first vehicle component to the adaptor;
- a first passage extending along a first portion of the axis from the first axial end surface towards the second axial end surface and configured to receive a second fastener from a first direction to secure the adaptor to the support member;
- a second passage extending along a second portion of the axis through the second axial end surface towards the first axial end surface and configured to receive a third fastener from a second direction opposite the first direction to secure a second vehicle component to the adaptor; and
- a third passage extending transverse to and between the first passage and the second passage through the shaft and configured to receive a fourth fastener to secure a third vehicle component to the adaptor.

23. The multifunctional adaptor of claim 22, wherein the third passage extends entirely through the body in a direction that is perpendicular to at least one of the first passage and the second passage.

* * * * *